United States Patent [19] | [11] 3,955,934
Tizzi | [45] May 11, 1976

[54] SEMIMANUFACTURED PRODUCT FOR USE IN JEWELRY

[76] Inventor: Valtiero Tizzi, 43 Via Bastioni Settentrionali, Rimini, Italy, 47037

[22] Filed: Oct. 29, 1973

[21] Appl. No.: 410,360

[30] Foreign Application Priority Data

Nov. 13, 1972 Italy ................................ 13004/72

[52] U.S. Cl. ................................ 29/191; 29/191.4; 63/2

[51] Int. Cl.² .................... B32B 15/00; A44C 25/00

[58] Field of Search ............ 29/183, 180 SS, 180 R, 29/191, 191.4, 191.6, 160.6; 52/311, 312; 35/27; 63/2

[56] References Cited

UNITED STATES PATENTS

| | | | |
|---|---|---|---|
| 219,008 | 8/1879 | Obrig | 29/160.6 X |
| 268,469 | 12/1882 | Edge | 29/160.6 X |
| 281,928 | 7/1883 | Rothschild | 63/2 X |
| 426,059 | 4/1890 | Planchamp | 29/191 |
| 711,661 | 10/1902 | Henderson | 52/311 |
| 734,066 | 7/1903 | Heintz | 29/160.6 X |
| 1,125,423 | 1/1915 | Wiley | 35/27 |
| 2,747,259 | 5/1956 | Brioux | 29/160.6 |
| 2,811,203 | 10/1957 | Garbarino | 29/193.5 |
| 3,063,137 | 11/1962 | Leach | 29/160.6 X |

*Primary Examiner*—Allen B. Curtis
*Attorney, Agent, or Firm*—Larson, Taylor and Hinds

[57] ABSTRACT

A semimanufactured product for use in jewelry comprises a support band made of metal, on one face of which there is secured, by welding, at least one decorating band, also made of metal, provided with apertures.

The surface of the support band and the surface of the decorating band present a different outer appearance, due either to different coloring, or to different design (obtained by machining or etching), or both, so that an optical contrast is obtained. The apertures may be filled with complementary shaped pieces of metal, which also present a different outer appearance. The total thickness of the assembled and secured support band and decorating band (or bands) corresponds to the thickness of use of the semimanufactured product, and is comprised between 0.15 mm and 5.00 mm.

9 Claims, 9 Drawing Figures

D
D1
D2
P
S

SEMIMANUFACTURED PRODUCT FOR USE IN JEWELRY

BACKGROUND OF THE INVENTION

1. Field of the Invention

This invention relates to a semimanufactured metallic product, to be used in the industry for the production of articles of jewelry and false ornaments. The semimanufactured product according to the invention is in the form of a band, presenting substantially two faces. At least one face of the band presents an outer appearance with optical contrasts deriving from contrasting colors or designs, or both.

2. Description of the Prior Art

In the field of jewelry it is often requested to provide sheet metal of an improved and ornamental appearance capable of being used for the manufacture of a variety of articles. Heretofore it has been known, for example, to secure on a support sheet or plate some decorating strips, and then to roll the resulting composite sheet or plate to a desired thickness. This technique, and the resulting product, is illustrated, for example, in the British Pat. Specification No. 243,112 and in the U.S. Pat. No. 3,063,137. The resulting product, however, presents the inconvenience due to the fact that the rolling operation, which is effected to reduce the sheet or plate to the desired thickness, causes a substantial deformation on the pattern or design of the strips applied onto the support plate, thus spoiling the final decorative appearance.

On the other hand, if the rolling down of the prepared composite sheet or plate is not effected, the thickness of the semimanufactured product will be too much great, and therefore it will influence greatly the costs of the production of the finished jewelry articles, particularly in the case of precious metals, such as gold or silver.

SUMMARY OF THE INVENTION

The semimanufactured product according to the invention is substantially characterized by the fact that it consists of a composite band which has a thickness between 0.15 mm and 5.00 mm and which presents on at least one of its faces, substantially for the whole of its extension, a contrasting pattern formed by two or more metals or alloys having different colors and/or surface design.

Preferably, the product in accordance with the invention consists of a support made of a rolled sheet of metal in the form of a band, which has on one face applied and secured, preferably by welding, one or more metallic bands which are differently colored between each other and/or with respect to the support band. The thickness of the support band and of the decorating bands which are applied onto it are such that the total resulting thickness of the semimanufactured product corresponds substantially to the optimum thickness at which the product is to be used, as above specified.

For "optimum thickness" of the semimanufactured product it is meant the thickness which is more suitable for the subsequent working of the said semimanufactured product into an object of jewelry. It is most important to note that the semimanufactured product according to the invention is ready for use as jeweler's stock and does not need to undergo any rolling operation which would spoil its outer appearance, due to the unavoidable deformations which take place in the metal sheet during a rolling operation.

The optical contrast of the face (or faces, in the case that both faces of the band are decorated) is obtained, as above said, either by different coloring of the decorating bands and/or of the support band, or by different design of the decorating bands and/or of the support band, or by a combination of both contrasts.

In order to obtain a chromatic contrast, it is known, for example, that the color of the alloys of gold varies depending upon the different metals which are added, in different percentages, to the alloy itself. Thus, copper gives to gold a reddish color, silver gives a light green color, palladium a white color, and so on. Analogous difference may be obtained with the alloys of silver.

By contrast of "design" it is meant a contrast of the appearance of the surfaces of bands which have been differently decorated, for example by mechanical means, such as engraving, or by chemical means, such as etching. In this case, it is evident that it is not required, in order to furnish an optical contrast, that the metals of the support band and of the decorating bands be different or present a different color.

According to an essential characteristic feature of the invention, the decorating band or bands which are secured onto the support band are shaped and arranged in such a manner so that the resulting surface pattern extends in a uniform manner or is repeated at constant lengths along the whole length of the support band, thus permitting to obtain from the semimanufactured product, for example by means of stepwise blanking, pieces which are equal the one to the other as for what concerns the shape, outer appearance and weight, to be subjected to further forming operations for the manufacture in series of objects of jewelry or ornaments in general.

BRIEF DESCRIPTION OF THE DRAWINGS

The invention will be better understood from the following description of some preferred embodiments of same, made with reference to the attached drawings, in which.

DESCRIPTION OF THE PREFERRED EMBODIMENTS

Figures 1, 2, 3:
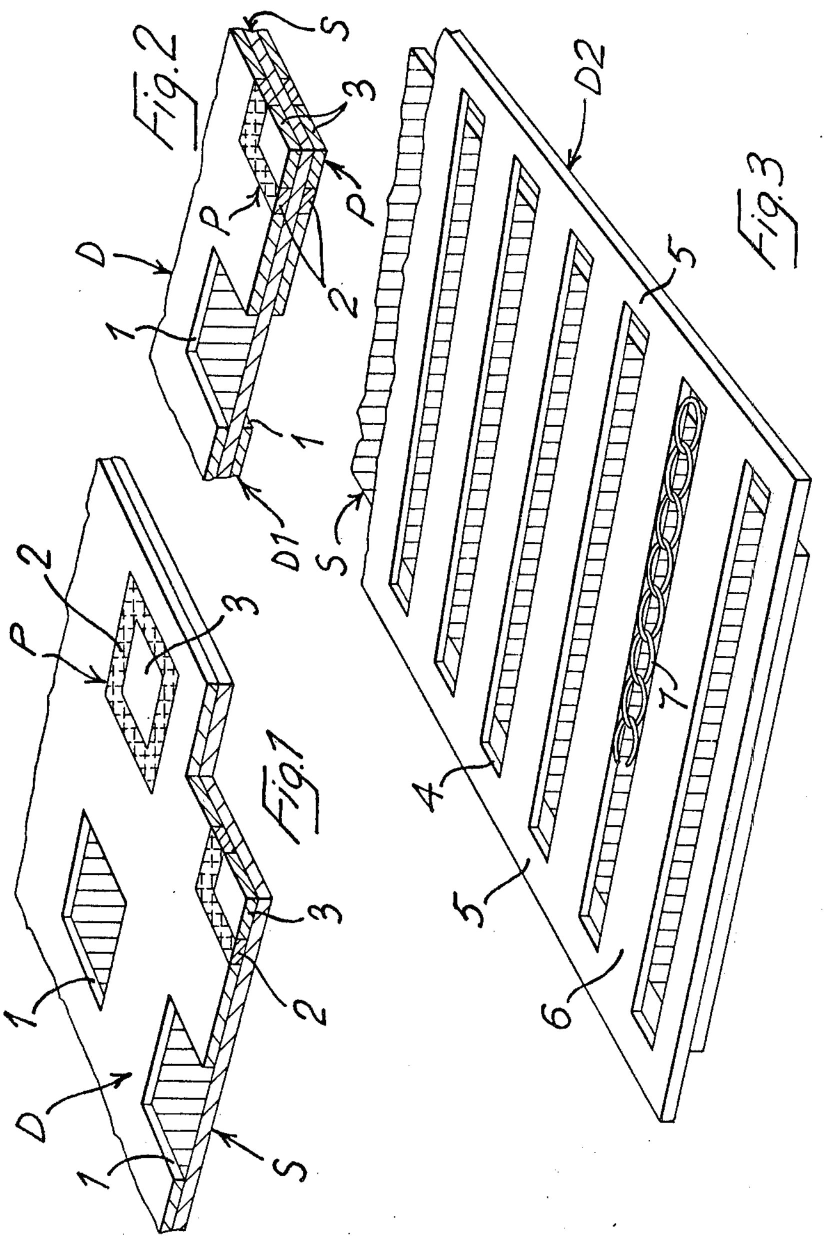
FIG. 1 is a perspective view, in an enlarged and somewhat exaggerated scale, of a piece of semimanufactured product according to the invention.
FIGS. 2 to 9 illustrate in a manner analogous to FIG. 1, as many different embodiments of the product.

Referring to FIG. 1 of the drawings, the semimanufactured product consists of a support band S made of any suitable metal or alloy, and presenting substantially two flat faces. Onto one face of the support band S there is secured, preferably by a suitable welding process, a decorating band D, which also presents two flat flaces and is made of any suitable metal or alloy. The total thickness of the two superposed and secured bands is comprised between 0.15 mm and 5.00 mm. More particularly, in the case of bands made of gold or gold alloys, the total thickness is in the range from 0.15 mm to 1.2 mm, while in the case of silver or silver alloys the total thickness varies preferably between 0.4 mm and 5.00 mm. This latter range of thickness applies also to other metals or alloys, such as may be for example copper.

The decorating band D presents apertures 1, which are arranged in an orderly manner, and may have any desired contour. These apertures 1 may be left blank, or may be filled with insert plates P, which may be in the form of simple plates or, as shown in FIG. 1, may be of a composite mosaic type, resulting from two different pieces of metal 2 and 3. The insert plates P present preferably the same thickness as the decorating band D, and are secured to the support band S for example by the same welding process used for securing the said decorating band D to the said support band S.

The outer face of the support band S which is the face onto which there is secured the decorating band D, and the outer face of the decorating band D which is the face opposite to the face which is in intimate contact with the support band S, present a different appearance, so that an optical contrast will be obtained in the case that the apertures 1 have been left blank. Also, the pieces of metal 2 and 3 which compose the mosaic plate P inserted, if desired, into the aperture 1, present a different surface appearance the one with respect to the other and with respect to the appearance of the mentioned outer face of the decorating band D, therefore providing also in this case an optical contrast.

This different appearance of the outer surfaces of the metal bands and of the insert pieces may derive from a different design, obtained for example from mechanical engraving (as by machining) or by chemical etching, or may derive from a different color of the metals employed for the support band, for the decorating band and for the insert pieces. The different coloration of the metals may be obtained, for example, by adding different components to the base metal of an alloy. Thus, it is known that copper confers to gold a reddish color, silver confers to gold a light green color, palladium confers a white color, and so on.

Of course, the different appearance of the outer surfaces is not limited to either contrasting designs or contrasting colors, but a combination of the two contrasts is possible, and in fact it is desirable.

The embodiment shown in FIG. 2 relates to a semimanufactured product, in which the support band S is sandwiched between two decorating bands D and D1, one for each face of the support band. As it is apparent, both the decorating bands D and D1 present apertures 1 which, if the case, are filled with composite mosaic plates P comprising pieces 2 and 3.

Referring now to FIG. 3, there is shown another embodiment of the semimanufactured product according to the invention. In this case, onto the support band S there is secured a decorating band D2 which presents elongated apertures 4 extending transversally of the said decorating band D2 which assumes a gridiron aspect. The decorating band D2 is larger than the support band S, of such an amount that the two longitudinal side strips 5, which constitute the proper side edges of the decorating band, do not cover the said support band. This particular feature results to be advantageous in the subsequent processing of the product, where the side strips 5 may be sheared off, whereby the subsequently worked product results practically to be the superposition of transversal strips 6, which are spaced apart and aligned, onto the support band S.

Still with reference to FIG. 3, it is to be noted that, as a further decorating feature, a small chain 7, or other similar ornament, can be inserted in the blank space of apertures 4.

Figure 4:
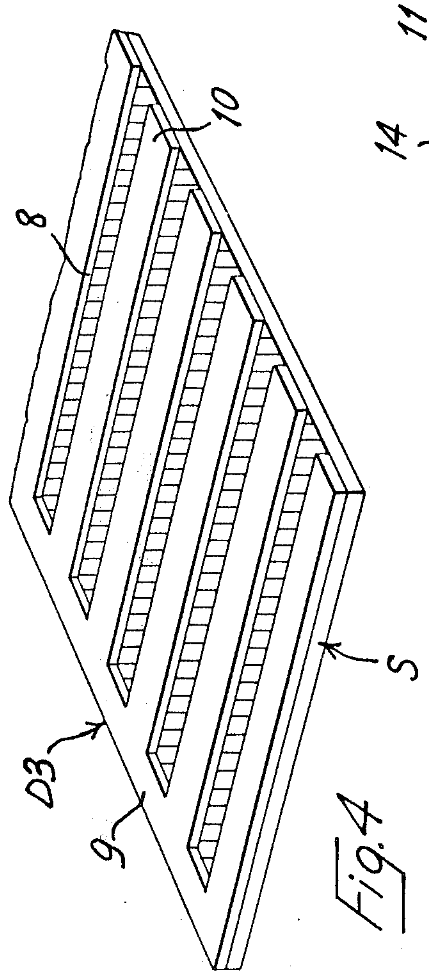

Referring now to FIG. 4, it can be seen that the apertures 8 of the decorating band D3 extend transversally and open out of one edge of the decorating band itself, so that the said decorating band D3 assumes a comblike structure, with a longitudinal side strip 9 and transversally aligned equispaced teeth 10. Similarly to the embodiment of FIG. 3, also in this case the decorating effect will result from the contrast of the outer surface of the decorating band D3 and of the surface of the support band S which is not covered by the transversal teeth or strips of the said decorating band.

Figure 5:
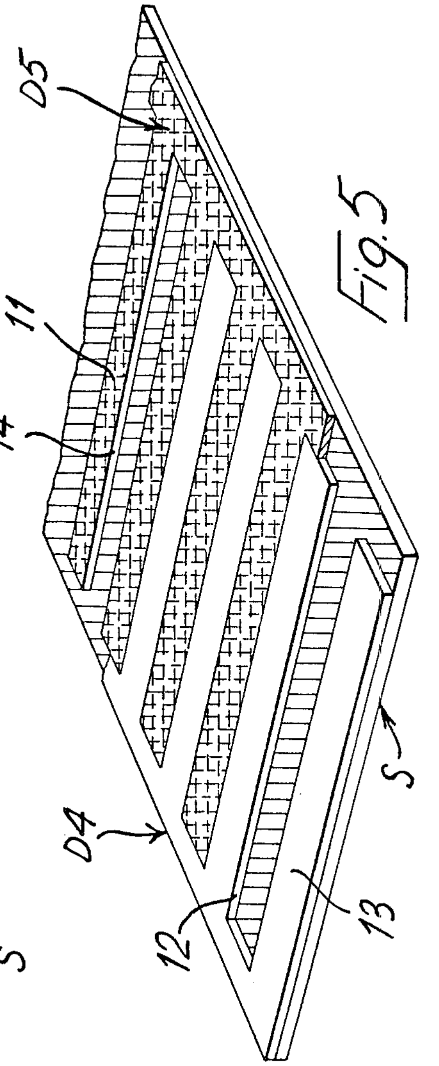

With reference to FIG. 5, there is shown an embodiment where the support band S is covered, on one face, by two decorating bands D4, D5 which both present a comblike structure, similarly as for what described with reference to the decorating band of FIG. 4, and which are complementarily shaped, so that the teeth 11 of band D5 exactly fill the apertures 12 of band D4, and viceversa the teeth 13 of band D4 exactly fill the apertures 14 of band D5. The thickness of both decorating bands D4, D5, is equal, so that the resulting outer surface of the finished product will be a perfectly flat surface, and the optical contrast will be furnished by the different coloration and/or design of the outer surfaces of the said decorating bands.

Figure 6:
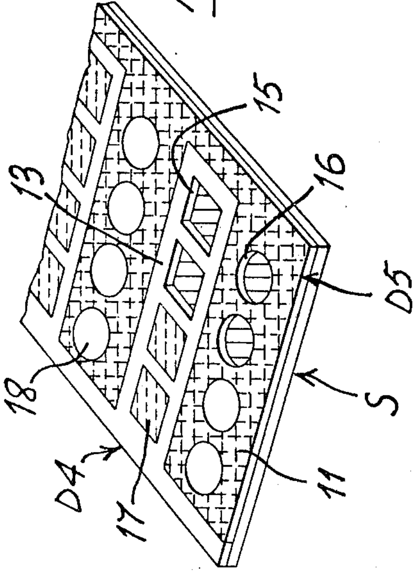

FIG. 6 shows a variation of the embodiment of FIG. 5, where the teeth of the two decorating bands D4 and D5 present differently shaped apertures 15 and 16 which may be left blank, so as to render visible the surface of the underlying support band S, or may be filled with correspondingly shaped plates 17 and 18.

Figure 7:
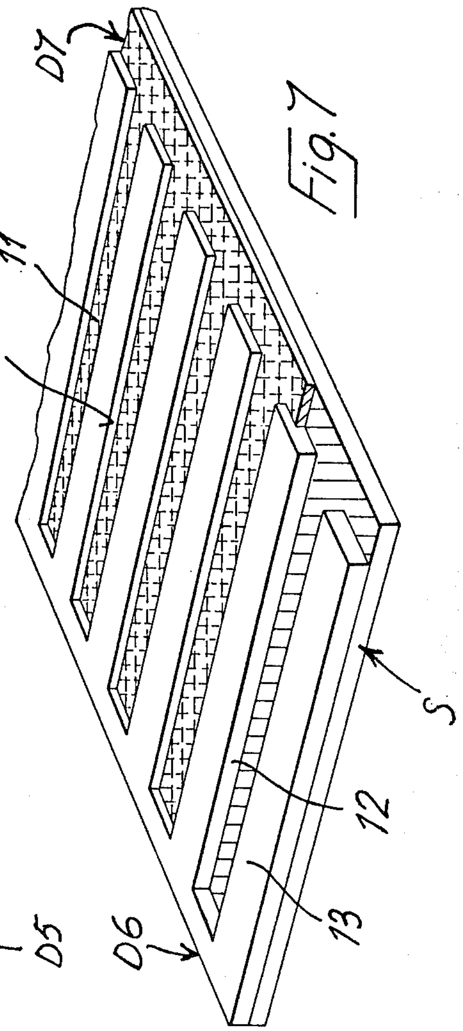

Also FIG. 7 can be considered as a variation of the embodiment shown in FIG. 5. In the present case, however, the two decorating bands D6 and D7, which are shaped as comb-like structure and engage the one into the other in a complementary manner, present a different thickness. More particularly, the thickness of decorating band D6 is greater than the thickness of decorating band D7.

Figure 8:
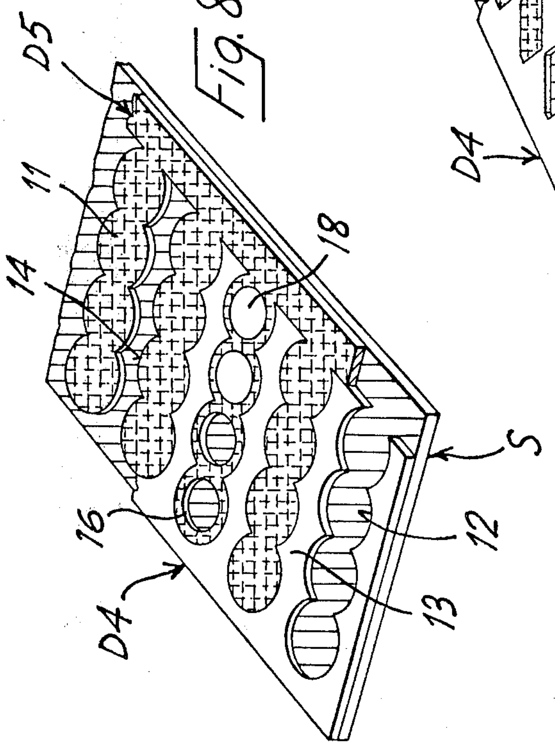

Turning now to the embodiment of FIG. 8, same can be considered still a variation of the one shown in FIG. 5, the differences residing in the shape of the complementary teeth of the comb-like decorating bands D4 and D5. Thus, while the teeth of the embodiments described up to now presented a substantially rectilinear edge, the teeth in the embodiment of FIG. 8 present respectively a cuspidal design, with several apexes (13) and respectively a design formed by several intersecting circumferences (11). Inside each of the circumferences of teeth 11 there may be provided a circular aperture 16, which may be left blank, or filled with a decorating plate 18.

Figure 9:
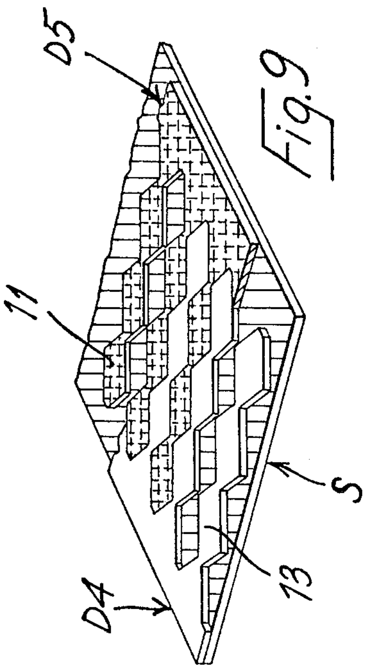

The embodiment of FIG. 9 illustrates still a further variation of the basic embodiment shown in FIG. 5. Here the teeth 11 and 13 of the two decorating plates D4 and D5 are practically formed by a series of lozenges connected the one to the other by their acute angles.

It appears evident, from the foregoing, that the semimanufactured product above described can be widely used in the field of the industrial production of jewelry or of false ornaments. From the semimanufactured product there may be obtained, for example by blanking operation, pieces having a determined shape and size, which can be successively worked (bending, piercing, shaping) to any desired object of ornament.

As mentioned above, the support band and the decorating band or bands are secured together preferably by welding. In this case, and particularly in the case of electrical welding processes, it is advisable that the surfaces of the two bands which come into contact the one with the other, be provided with adjoining micro-grooves, having a depth from 0.05 mm to 0.5 mm. In the case of securing by welding of the two contacting surfaces of the support band and of the decorating band, very satisfactory results have been attained by preparing the surfaces to be welded as clean, highly polished, bare metal surfaces.

It is believed that the invention will have been clearly understood from the foregoing detailed description of some preferred embodiments. Changes in the details of construction may be resorted to without departing from the spirit of the invention, and it is accordingly intended that no limitation be implied and that the hereto annexed claims be given the broadest interpretation to which the employed language fairly admits.

I claim:

1. A semimanufactured jewelry product, comprising an essentially flat elongated support band of metal presenting substantially two opposed faces, and two essentially flat decorating bands of metal, each presenting substantially two opposed faces, the two said decorating bands being essentially co-planar and both being secured, by one of their faces, onto the same one face of the support band, each one of said decorating bands being provided with apertures which extend transversely to same and to the support band and open out of one longitudinal edge of that said band, so as to confer to that said decorating band a comb-like structure comprising a longitudinal side strip extending longitudinally on the elongated support band and a row of aligned teeth, the teeth of one comb-like structure decorating band extending from its strip transversely of the elongated support band for a major portion of the width of the strip into the apertures between the teeth of the other opposed and co-planar comb-like structure of the other decorating band, the thickness of the decorating bands in the finished semimanufactured product being substantially the same as when originally applied to the support band.

2. A semimanufactured product according to claim 1 in which the assembled and secured support band and decorating bands present a total thickness between 0.15 mm and 5.00 mm.

3. A semimanufactured product according to claim 2 in which the support band and decorating bands are made of gold or gold alloy and the total thickness is comprised between 0.15 mm and 1.2 mm.

4. A semimanufactured product according to claim 2 in which the support band and decorating band are made of silver or silver alloy and the total thickness is comprised between 0.4 mm and 5.00 mm.

5. A semimanufactured product according to claim 1, in which the teeth of one decorating band are shaped so as to complementarily engage the teeth of the opposed decorating band.

6. A semimanufactured product according to claim 1, in which the two decorating bands present a contrasting outer appearance.

7. A semimanufactured product according to claim 1, in which the two decorating bands present a different thickness.

8. A semimanufactured product according to claim 1, in which the teeth of at least one decorating band are provided with apertures.

9. A semimanufactured product according to claim 8, in which the apertures in the said teeth are filled with complementarily shaped plates having an outer surface appearance different from the outer appearance of the decorating band.

* * * * *